(12) United States Patent
Lang et al.

(10) Patent No.: US 9,485,916 B2
(45) Date of Patent: Nov. 8, 2016

(54) AGRICULTURAL BALER NEEDLE STABILIZER

(71) Applicant: DEERE & COMPANY, Moline, IL (US)

(72) Inventors: Eric R. Lang, Newhall, IA (US); Henry Dennis Anstey, Ottumwa, IA (US); Timothy James Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 773 days.

(21) Appl. No.: 13/852,032

(22) Filed: Mar. 28, 2013

(65) Prior Publication Data

US 2014/0290504 A1  Oct. 2, 2014

(51) Int. Cl.
  *A01F 15/14* (2006.01)

(52) U.S. Cl.
  CPC ............. *A01F 15/14* (2013.01); *A01F 15/145* (2013.01)

(58) Field of Classification Search
  CPC ..... A01F 15/14; A01F 15/145; A01D 59/04; A01D 59/00; B65B 9/30; B65B 13/18; B65B 13/20
  USPC ......... 100/33 R; 56/343, 433, 435, 439, 441, 56/445
  See application file for complete search history.

(56) References Cited

U.S. PATENT DOCUMENTS

| 3,416,824 A | 12/1968 | Nolt et al. |
| 3,850,091 A * | 11/1974 | McIlwain ............... A01F 15/14 |
| | | 100/19 R |

FOREIGN PATENT DOCUMENTS

| DE | 9207868 U1 | 8/1992 | |
| DE | 4120559 A1 * | 12/1992 | ........... A01F 15/145 |
| GB | 2034244 A * | 6/1980 | ............. A01F 15/08 |

OTHER PUBLICATIONS

European Search Report issued in counterpart application No. 14160860.4, dated Aug. 25, 2014 (5 pages).

* cited by examiner

*Primary Examiner* — Jimmy T Nguyen (57) ABSTRACT

An agricultural baler including a base unit, a plurality of ground engaging devices supporting the base unit and at least one tie system mounted to the base unit. The at least one tie system including a needle moveable relative to the base unit and a needle stabilizer. The needle stabilizer attached to the base unit with the needle stabilizer contacting the needle over a portion of the movement of the needle.

6 Claims, 10 Drawing Sheets

AGRICULTURAL BALER NEEDLE STABILIZER

FIELD OF THE INVENTION

The present invention relates to an agricultural baler, and, more particularly, to an apparatus to stabilize the movement of a needle in an agricultural baler.

BACKGROUND OF THE INVENTION

A cut and raked crop that has been dried or otherwise prepared in a field, such as hay, straw or other agricultural material is often gathered, compressed and shaped by an agricultural baler. There are several types of balers that are commonly used, each resulting in different types of bales. Some are rectangular and some are cylindrical of various sizes. Bales can be bound with netting, strapping, wire or traditionally twine using a tie system to connect ends of the twine. Large square balers often use a double tie knotting system. The double tie knotter ties two knots, one to complete the previous bale, and another to start the next or current bale. Twine is then directly fed out of the twine galls during bale formation. A typical large square bale weighs between 800 and 1,600 pounds and is often dropped in the field by the baler, for later retrieval, as the baling system proceeds though the field.

A baler that produces small rectangular bales, often also called square bales, produce bales that are typically wrapped with two strands of knotted twine. The bales are light enough for easy handling and typically weigh from 40 to 80 pounds each. A bale is formed by a series of processes performed by the square baler including lifting the windrowed material, hereinafter referred to as hay, by way of the pickup portion of the baler. The hay is then moved by way of an auger into a chamber that has a feeding fork. The feeding fork moves the hay in front of a sliding plunger with a cutting edge that cuts the hay and moves the hay in the chamber into previously packed hay therein causing the hay to be compressed. Once a predetermined amount of hay has been gathered in the chamber, as measured by the amount being extruded through the opening at the rear of the chamber, a mechanism is triggered causing the twine to be threaded through the hay, cut and then knotted thereby forming the bale and one portion of the twine is retained to start to receive hay for the next bale. As the bales are moved through the compression channel out to the rear of the baler, the baled hay is then either loaded onto a wagon or dropped into the field for later retrieval.

To operate properly the tie system of either a large or small square baler requires the twine to move properly without snagging on parts of the baler so that the twine is positioned by a needle for proper knotting by the tie system. The tie system itself carries out a choreographed sequence of operations, which is subject to malfunction if the twine is not properly routed by the needle to the knotters. The adjustment of the needle to properly meet the knotter is carried out by adjusting the knotter to the needle in a comparatively expensive manner.

What is needed in the art is a baler that provides for a cost effective fine adjustment of the needle movement so that it properly meets the knotter of the tie system.

SUMMARY

The present invention provides a cost effective fine adjustment of the needle pathway relative to a knotter of an agricultural baler.

The invention in one form is directed to an agricultural baler including a base unit, a plurality of ground engaging devices supporting the base unit and at least one tie system mounted to the base unit. The at least one tie system including a needle moveable relative to the base unit and a needle stabilizer. The needle stabilizer attached to the base unit with the needle stabilizer contacting the needle over a portion of the movement of the needle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrate embodiments of the invention and such exemplifications are not to be construed as limiting the scope of the invention in any manner.

DETAILED DESCRIPTION

Figure 1:
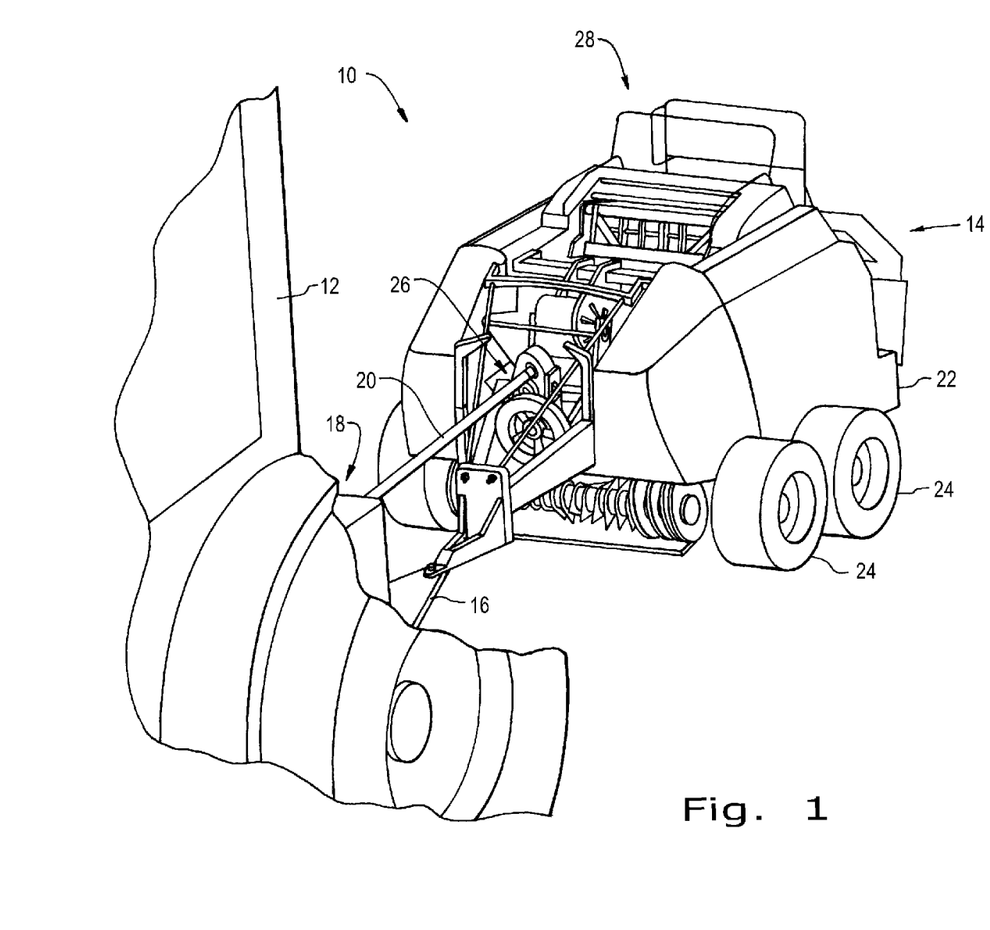
FIG. 1 is a perspective partially sectioned view of a baling system including an embodiment of a tie system of the present invention.
Figure 2:
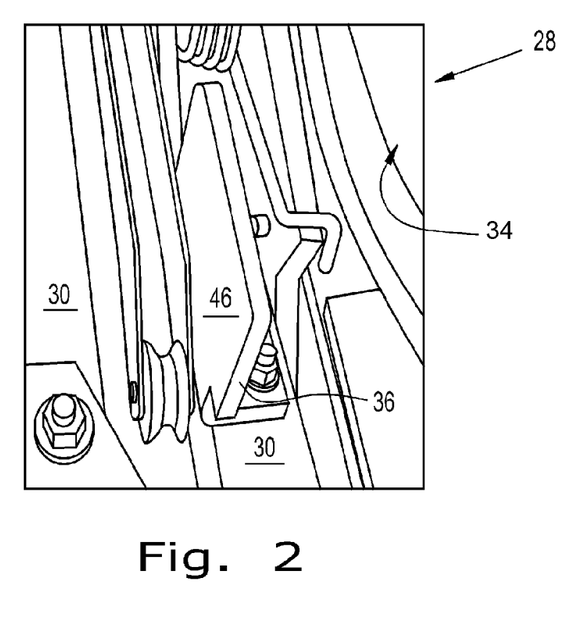
FIG. 2 is a perspective view of a knotter table of the tie system used in FIG. 1 having an embodiment of a needle stabilizer of the present invention connected thereto.
Figure 3:
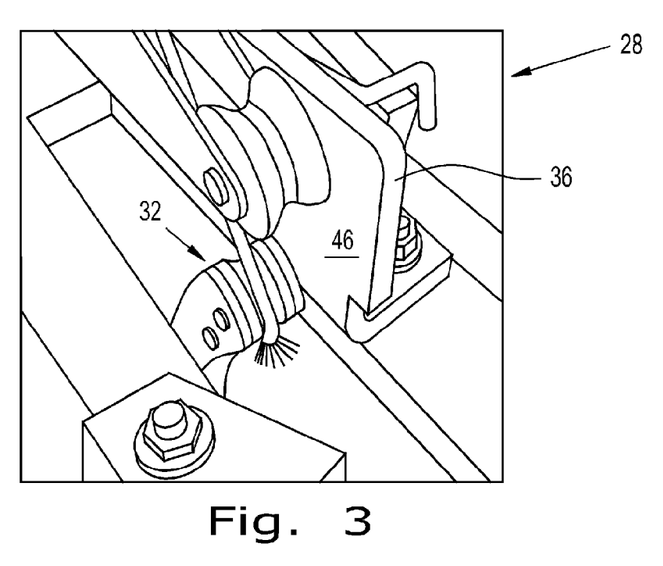
FIG. 3 is another perspective view of the needle stabilizer of FIG. 2.
Figure 4:
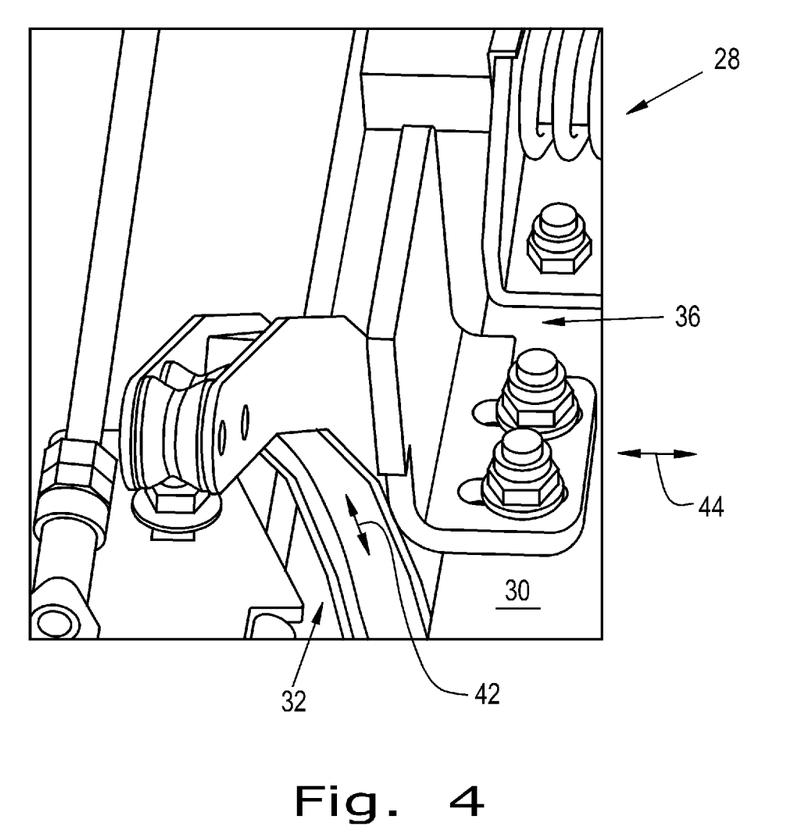
FIG. 4 is yet another perspective view of the needle stabilizer of FIGS. 2 and 3.
Figure 5:
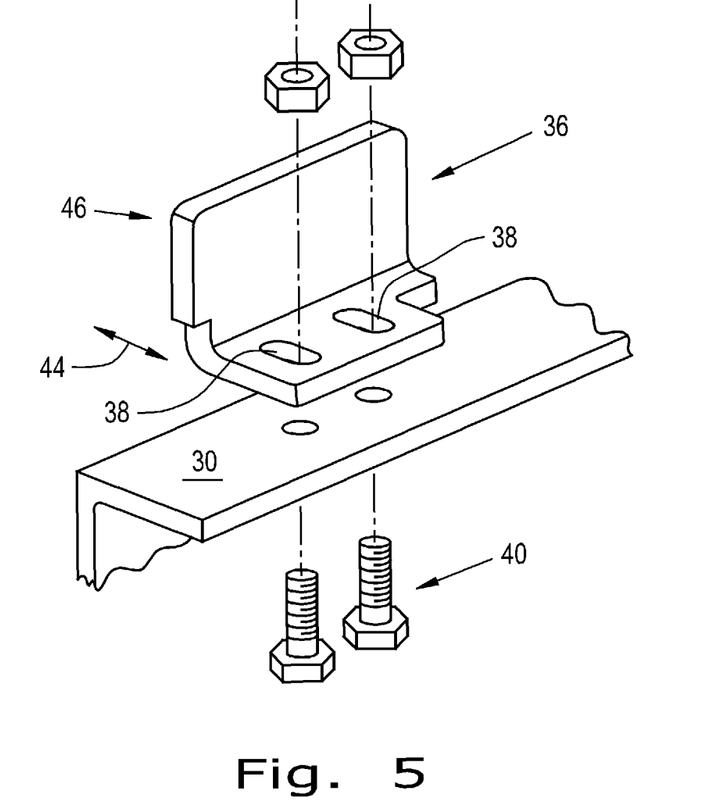
FIG. 5 is an exploded view of the needle stabilizer of FIGS. 1-4.

Referring now to the drawings, and more particularly to FIG. 1, there is illustrated a baling system 10 including a tractor 12, and a baler 14. Baler 14 is connected to tractor 12 by way of hitch 16 thereby providing towing for the movement of baler 14. Tractor 12 additionally has a power takeoff (PTO) unit 18 providing rotational power by way of PTO shaft 20 to mechanisms in baler 14.

Baler 14 includes a base unit 22, ground engaging devices 24 and a transmission 26 connected to base unit 22. PTO shaft 20 connects to transmission 26 providing rotational power to transmission 26. A tie system 28 is powered indirectly by power transmitted to baler 14 by shaft 20, and tie system 28 may have several knotting mechanisms associated with baler 14. For example, a large square baler with a width of 4 feet and a height of 3 feet typically has 6 knotting mechanisms to tie the twine strands that extend around the large square bale.

Now, additionally referring to FIGS. 2-5, elements of tie system 28 are shown including a knotter table 30, a needle 32, a knotter 34, a needle stabilizer 36 having slots 38 therein and being attached to knotter table 30 by way of fasteners 40 extending through slots 38. Knotter table 30 is attached to and/or integral with base unit 22. Knotter table 30 has openings therein, with needle 32 moving thorough an opening to bring twine to knotter 34. Needle 32 moves in a direction along a needle pathway 42 as it brings twine to knotter 34. Gross lateral adjustment of needle 32 is accomplished by shifting needle 32 relative to knotter table 30. In prior art systems then a fine adjustment of knotter 34 is undertaken so that needle 32 properly meets knotter 34 as needle 32 brings the twine to knotter 34. This prior art method is accomplished by a comparatively expensive method in terms of material and labor.

In the present invention a fine adjustment of pathway 42 is carried out by adjusting needle stabilizer 36 so that needle 32 then meets knotter 34 properly to convey the twine to knotter 34. The adjustment of needle stabilizer 36 takes place by moving needle stabilizer in a stabilizer adjustment direction to effect the fine adjustment of pathway 42. Needle stabilizer 36 has a face 46 that is generally parallel to pathway direction 42. Although face 46 is shown as flat other surface configurations are contemplated including a face with a radius. Face 46 contacts a portion of needle 32 as it moves toward knotter 34 to ensure that pathway 42 leads to knotter 34, so that the twine is delivered to knotter 34 for proper knot formation. Face 46 controls or limits a side-to-side travel of needle 32 and also serves to dampen vibration that may exist in needle 32. Face 46 is positioned by sliding needle stabilizer 36, in direction 44, within the limits of slots 38 and then needle stabilizer 36 is tightened to knotter table 30 by fasteners 40. Slots 38 lie in a direction generally perpendicular to both face 46 and pathway 42.

Needle stabilizer 36 is shown as being located only along one side of pathway 42 to control a variance in pathway 42 along the side where needle stabilizer 36 is positioned, but additional locations are also contemplated. Needle stabilizer 36 is generally L-shaped in cross section, with a curve along the intersection of the horizontal and vertical parts of the L-shape, so that needle 32 does not hit a sharp edge as it encounters needle stabilizer 36. The coarse adjustment discussed above can be considered a first degree of adjustment, while the fine adjustment afforded by the side-to-side adjustment of needle stabilizer 36 is a second degree of adjustment. The first degree of adjustment being either the location and orientation of needle 32 relative to knotter table 30 and/or the positioning of knotter 34, and the second degree of adjustment being applied, by way of the position of needle stabilizer 36, so that it will encounter needle 32 during the travel of needle 32 to knotter 34. This second degree of adjustment results in an in-course adjustment of needle 32.

Advantageously, the present invention allows for a cost effective fine adjustment of the pathway of needle 32. Another advantage of the present invention is that the adjustment is easily carried out with simple tools.

Figure 6:
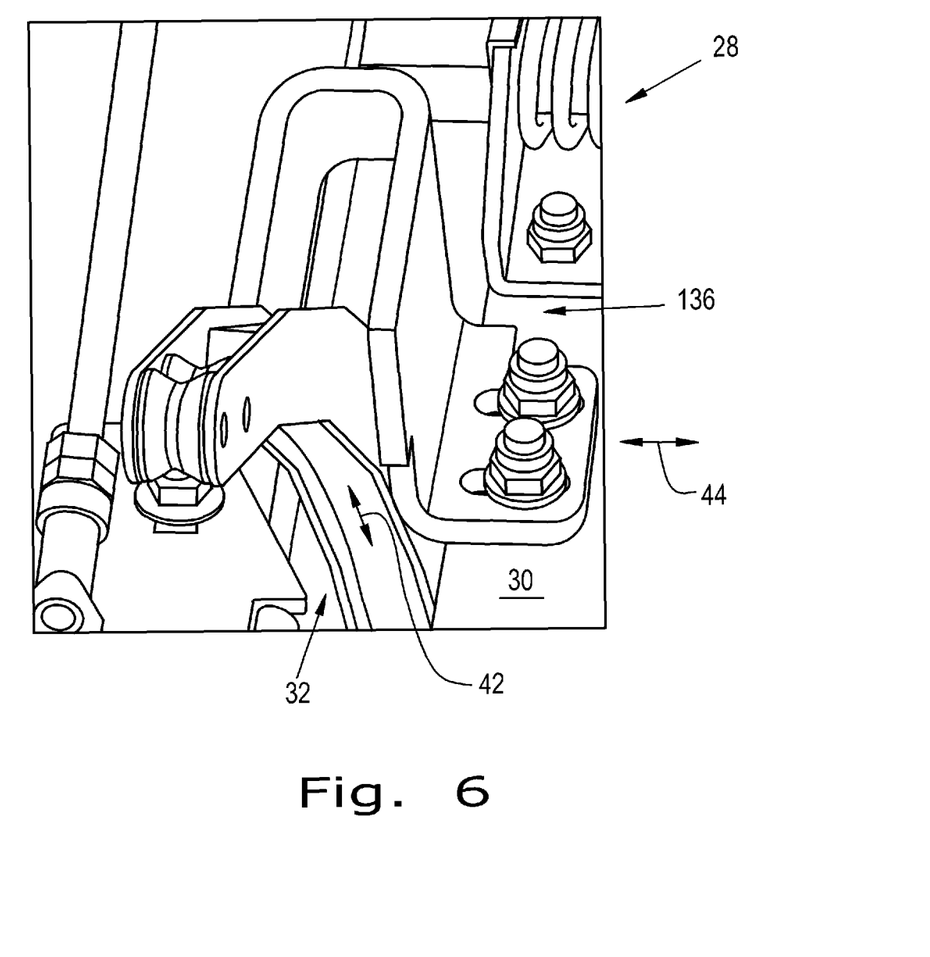
FIG. 6 is a perspective view of another embodiment of a needle stabilizer used in the baling system of FIG. 1.

Now, additionally referring to FIG. 6, there is illustrated another embodiment of a needle stabilizer 136. The addition of a multiple of 100 to the reference number is to illustrate that there is a similar purpose for the similarly numbered item in another figure, and that which is discussed may apply to other similarly numbered items. Needle stabilizer 136 wraps around pathway 42 and has two faces directed toward needle 32. Needle 32 may travel between the faces without contacting needle stabilizer 136 if, as needle 32 travels, it doesn't deviate from a desired path. However, vibrations of needle 32 as it travels along pathway 42 will likely cause needle 32 to contact at least one of the faces of needle stabilizer 136, thereby correcting the travel of needle 32 to more closely follow pathway 42. Needle stabilizer 136 removes a portion of the variability in the travel of needle 32 so that the twine can be accurately delivered to the knotting mechanism.

Figure 7:
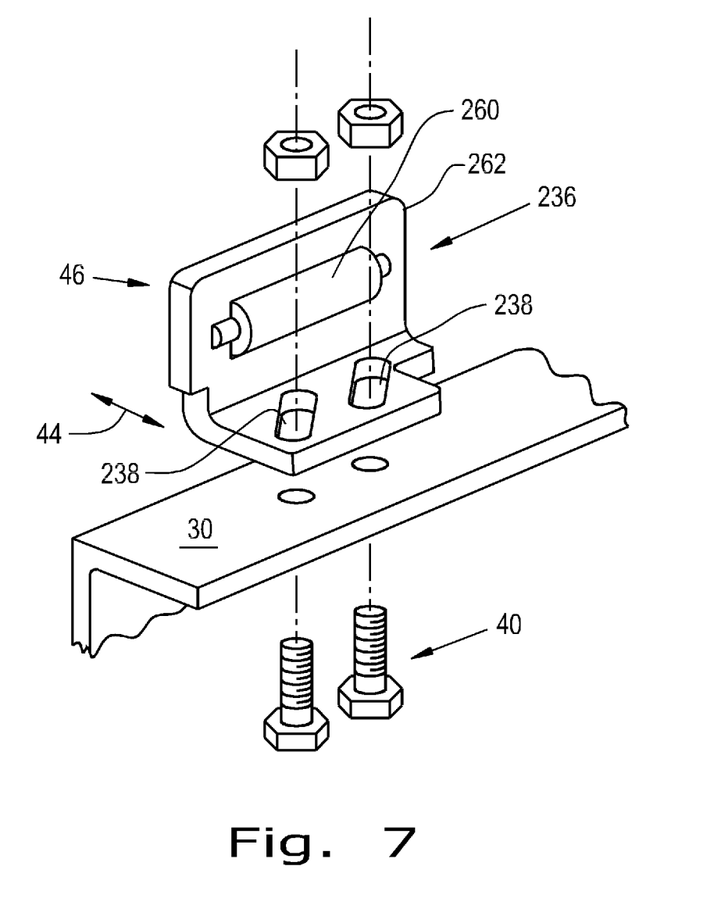
FIG. 7 is an exploded view of yet another embodiment of a needle stabilizer used in the baling system of FIG. 1.

Now, additionally referring to FIG. 7, there is illustrated a needle stabilizer 236 having angled slots 238 and a roller 260 rotatively connected to bracket 262, having a portion of roller 260 extending out of face 46. Slots 238 allow for the adjustment of needle stabilizer 236 at an angle relative to pathway 42. Roller 260 allows needle 32 to travel against a rotating surface of roller 260 as it proceeds along pathway 42.

Figure 8:
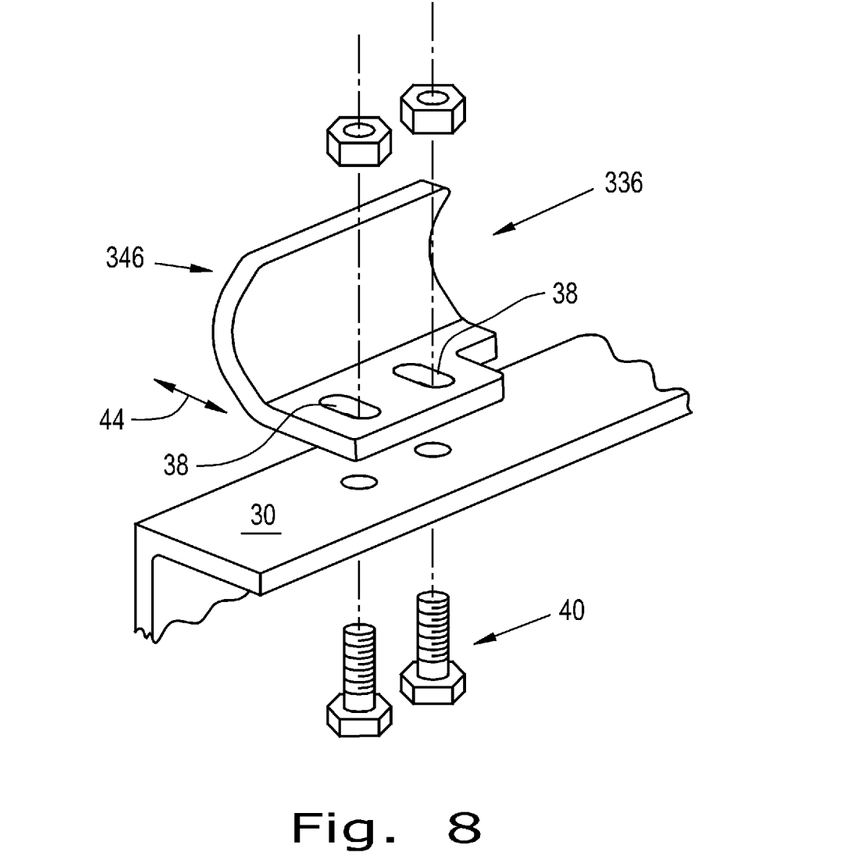
FIG. 8 is an exploded view of still yet another embodiment of a needle stabilizer used in the baling system of FIG. 1.

Now, additionally referring to FIG. 8, there is illustrated a needle stabilizer 336 having a curved face 346. Curved face 346 is shaped to engage needle 32 as it travels and allows the curved nature of face 346 to guide the travel of needle 32.

Figure 9:
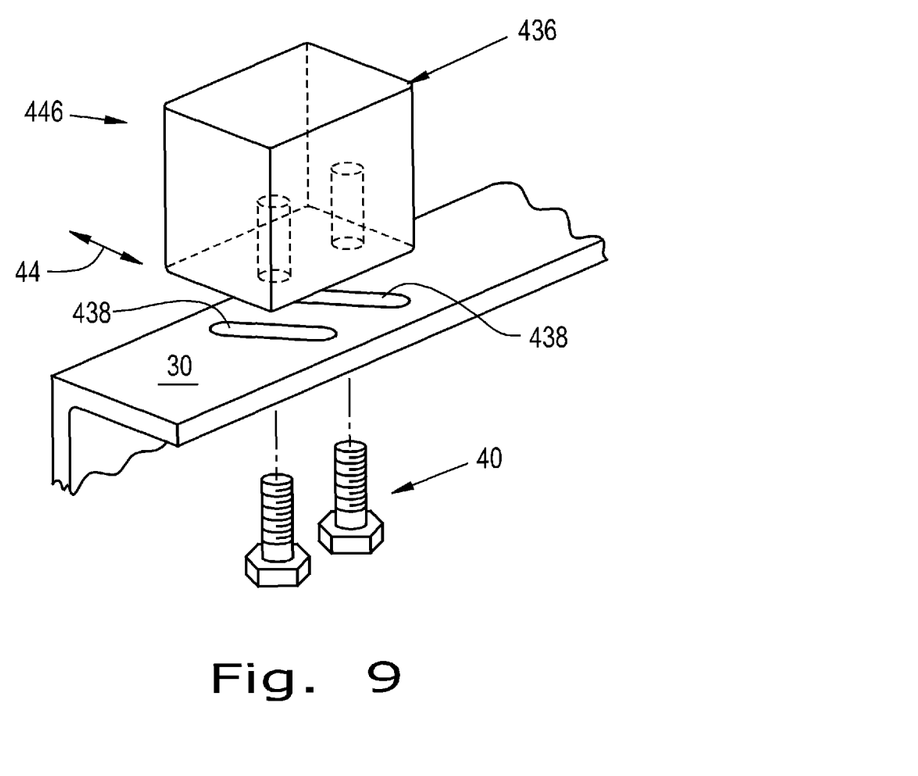
FIG. 9 is an exploded view of yet another embodiment of a needle stabilizer used in the baling system of FIG. 1.

Now, additionally referring to FIG. 9, there is illustrated a needle stabilizer 436 with a threaded portion to engage bolts 40 through angled slots 438 that are provided in knotter table 30. Although face 446 is illustrated as being flat it is also contemplated that another shape or attribute discussed herein may be employed with needle stabilizer 436.

Figure 10:
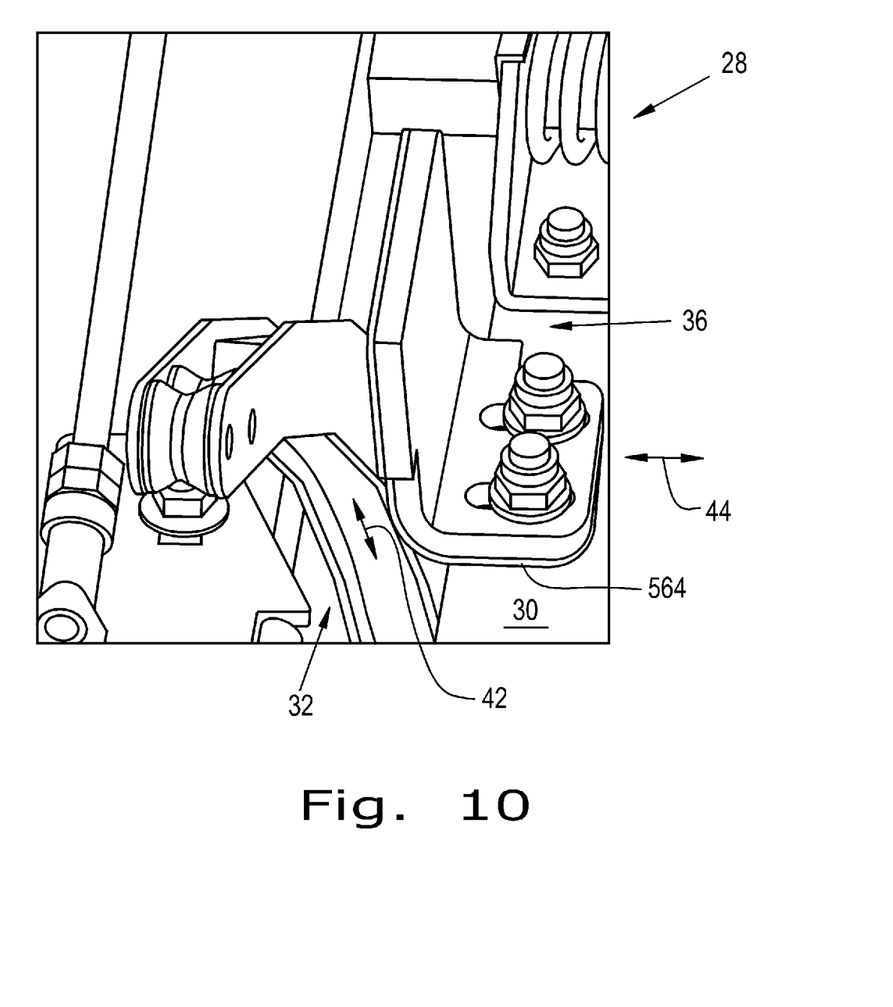
FIG. 10 is a perspective view of a further embodiment of a needle stabilizer used in the baling system of FIG. 1.

Now, additionally referring to FIG. 10, there is illustrated a needle stabilizer 36 with a shim 564 to thereby extend the face of needle stabilizer 36 toward pathway 42. It is contemplated that multiple shims 564 may be used and that the face of shim 564 may be shaped other that being flat.

Figure 11:
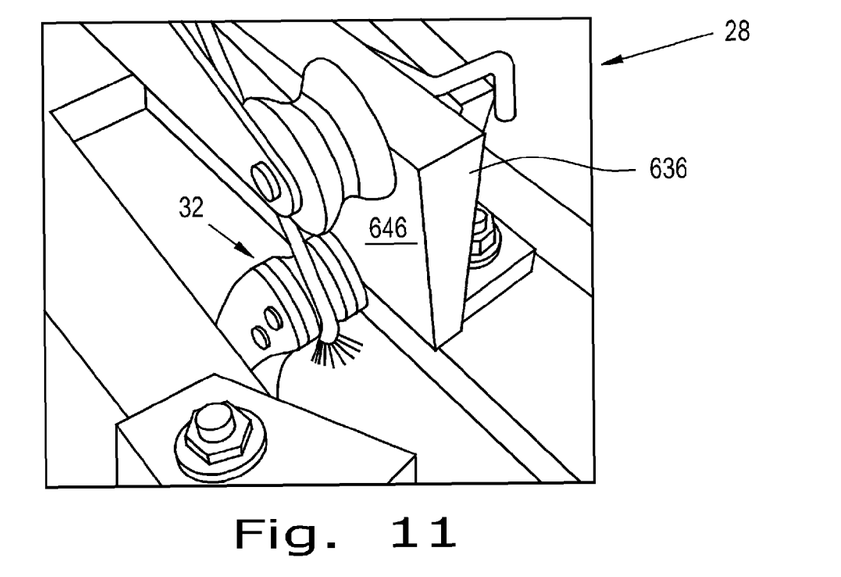
FIG. 11 is a perspective view of yet a further embodiment of a needle stabilizer used in the baling system of FIG. 1.

Now, additionally referring to FIG. 11, there is illustrated a needle stabilizer 636 having a sloped face 646 that angularly extends the surface of face 646 of needle stabilizer 636 toward pathway 42.

Figure 12:
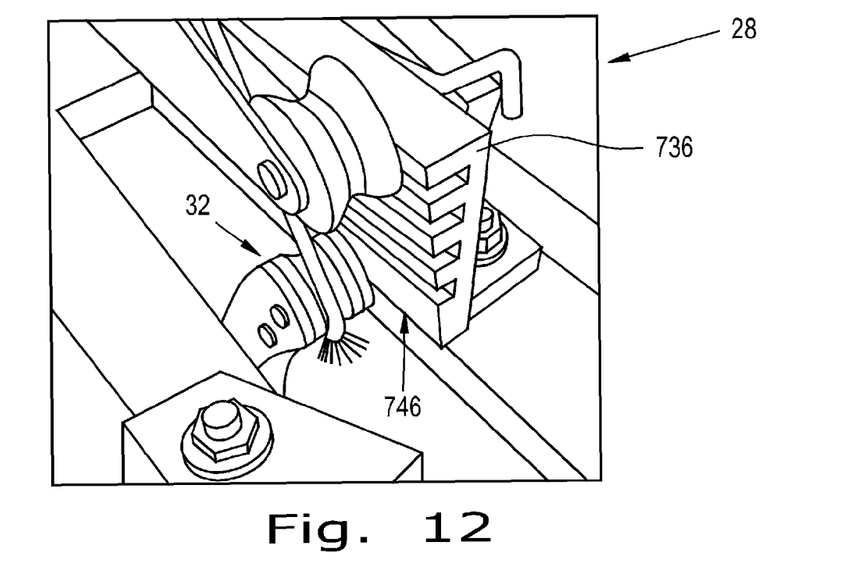
FIG. 12 is a perspective view of a still further embodiment of a needle stabilizer used in the baling system of FIG. 1.

Now, additionally referring to FIG. 12, there is illustrated a needle stabilizer 736 having an angled divided surface 746. Surface 746 is a featherboard type construct, with the individual elements progressively extending toward pathway 42. Needle stabilizer 736 may be made of a resilient material to absorb some of the contact energy, which may be present when needle 32 contacts needle stabilizer 736.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
   a base unit;
   a plurality of ground engaging devices supporting said base unit; and
   at least one tie system mounted to said base unit, said at least one tie system including:
   a needle moveable relative to said base unit; and
   a needle stabilizer adjustably attached to said base unit, said needle stabilizer controlling a position of said needle over a portion of the movement of said needle, the needle stabilizer having two opposing faces positioned along a pathway of the needle such that the needle travels between the two opposing faces over a portion of the movement of the needle, adjustment of the needle stabilizer causing the two opposing faces to adjust together, wherein said needle stabilizer includes at least one elongated slot generally arranged for lateral adjustment of said needle stabilizer relative to said pathway so that one of the opposing faces moves laterally toward a side of the needle.

2. The agricultural baler of claim 1, wherein the two opposing faces of the needle stabilizer are oriented in a general direction of the movement of said needle.

3. The agricultural baler of claim 1, wherein said tie system includes a knotter, said pathway of said needle being adjustable relative to said knotter to a first degree.

4. The agricultural baler of claim 3, wherein said needle stabilizer adjusts said pathway of said needle to a second degree, said first degree being a coarse adjustment and said second degree being a fine adjustment.

5. The agricultural baler of claim 4, wherein said knotter lacks an adjustment to adjust said knotter to said needle.

6. The agricultural baler of claim 3, wherein said needle stabilizer is positioned to reduce a variability in the movement of said needle along the pathway.

* * * * *